US012434213B2

(12) United States Patent
Anderson et al.

(10) Patent No.: US 12,434,213 B2
(45) Date of Patent: Oct. 7, 2025

(54) REACTOR TUBE ASSEMBLY

(71) Applicant: SABIC GLOBAL TECHNOLOGIES B.V., Bergen op Zoom (NL)

(72) Inventors: John Joseph Anderson, Mount Vernon, IN (US); Subramanian Brahmadathan Swernath, Bengaluru Karnataka (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 793 days.

(21) Appl. No.: 17/640,024

(22) PCT Filed: Sep. 16, 2020

(86) PCT No.: PCT/EP2020/075797
§ 371 (c)(1),
(2) Date: Mar. 3, 2022

(87) PCT Pub. No.: WO2021/052978
PCT Pub. Date: Mar. 25, 2021

(65) Prior Publication Data
US 2022/0314182 A1 Oct. 6, 2022

(30) Foreign Application Priority Data
Sep. 20, 2019 (EP) ..................... 19198513

(51) Int. Cl.
*B01J 8/06* (2006.01)
*B01J 8/02* (2006.01)
*C01B 32/80* (2017.01)

(52) U.S. Cl.
CPC ............. *B01J 8/065* (2013.01); *B01J 8/0292* (2013.01); *C01B 32/80* (2017.08)

(58) Field of Classification Search
CPC ... B01J 8/065; B01J 8/0292; B01J 8/06; B01J 8/067; B01J 2208/06; B01J 2208/065; C01B 32/80
See application file for complete search history.

(56) References Cited

U.S. PATENT DOCUMENTS

| 2002/0072643 A1* | 6/2002 | Butler .................... B01J 8/0453 585/440 |
| 2019/0031506 A1* | 1/2019 | Nicholson ............... C01B 3/384 |

FOREIGN PATENT DOCUMENTS

| KR | 100855045 B1 | 8/2008 |
| WO | 2009106231 A1 | 9/2009 |
| WO | 2019023157 A1 | 1/2019 |

OTHER PUBLICATIONS

International Search Report and Written Opinion for the corresponding International Application No. PCT/EP2020/075797; International Filing Date: Sep. 16, 2020; Date of Mailing: Oct. 9, 2020; 12 pages.

* cited by examiner

*Primary Examiner* — Deborah D Carr
(74) *Attorney, Agent, or Firm* — CANTOR COLBURN LLP

(57) ABSTRACT

The present invention relates to a reactor tube assembly comprising a reactor tube having a tube length and an inner surface, at least two tubular inserts each having an insert length and comprising i) a shell having an exterior portion at least partially contacting the inner surface of the reactor tube and ii) at least one fin projecting from the shell in a radial direction towards a center of said insert, wherein the inserts are positioned in the tube in a stacked manner such that the fins of the at least two inserts are offset in a longitudinal direction a particulate catalyst in contact with at least the shell and the fins of the inserts.

17 Claims, 5 Drawing Sheets

REACTOR TUBE ASSEMBLY

CROSS-REFERENCE TO RELATED APPLICATIONS

This application is a National Stage application of PCT/EP2020/075797, filed Sep. 16, 2020, which claims benefit of European Application No. 19198513.4 filed on Sep. 20, 2019, both of which are incorporated by reference herein in their entirety.

The present invention relates to a reactor tube assembly comprising a reactor tube and a particulate catalyst at least partially filling the internal volume of the reactor tube. Such a reactor tube assembly is advantageously used for reacting gaseous reactants.

An example of a reaction that is advantageously carried out in the reactor tube assembly is the reaction between carbon monoxide and chlorine using an activated carbon catalyst to form phosgene. As is well known this reaction is exothermic and in order to avoid degradation of the activated carbon catalyst and the formation of byproducts, such as carbon tetrachloride, the peak temperature in the reaction zone, i.e. in the part of tube assembly where the reaction takes place needs to be limited. This problem is addressed in the prior art and several solutions for avoiding side reactions and/or hotspots are proposed.

US 2006/0047170 discloses a process and apparatus for the production of phosgene, the process comprising reacting chlorine and carbon monoxide in the presence of an activated charcoal catalyst in a shell-and-tube reactor which contains a plurality of reaction tubes and a coolant space that surrounds the reaction tubes, wherein a) cooling of the reaction tubes is from the outside through the coolant space with water by evaporative cooling, and b) operating the reaction tubes at a pressure that is above the pressure in the coolant space.

WO 2015/119982 discloses a method of producing carbonate, comprising: reacting a feed comprising carbon monoxide and chlorine in a tube of a reactor to produce a product composition comprising phosgene, wherein the tube has a particulate catalyst contained therein, wherein a thermally conductive material separate from the tube contacts at least a portion of the particulate catalyst, and wherein carbon tetrachloride is present in the product composition in an amount of 0 to 10 ppm by volume based on the volume of the phosgene, wherein the reactor is capable of producing greater than or equal to 2,000 kilograms of the first product per hour; and reacting a monohydroxy compound with the phosgene to produce the carbonate.

WO 2015/013655 discloses a reactor and method for the manufacture of phosgene, the reactor comprising a tube located in a shell and a space located between the tube and the shell; a cooling medium located in the space and a catalyst located in the tube or cooling medium located in the tube and a catalyst located in the space; a feed inlet; and a product mixture outlet; wherein the tube comprises one or more of a mini-tube and a second tube section; a first concentric tube concentrically located in the shell; a twisted tube; an internal scaffold; and an external scaffold.

U.S. Pat. No. 3,857,680 discloses a catalyst structure comprising A) a thin sheet having two opposite sides and being formed of a metal of a given hardness, B) a great plurality of catalyst particles having a hardness greater than said given hardness and being partially embedded in a surface on each of said two opposite sides of said sheet, C) said sheet being folded to form a plurality of smaller sheets joined at edges of said smaller sheets to adjacent smaller sheets to form radially disposed segments of said smaller sheets which are all accurately bent in the same direction, whereby alternate edges of said smaller sheets form outer edges and D) a mass situated thermally adjacent to the outer edges of the sheets for conductive exchange of heat with said smaller sheets through said edges.

U.S. Pat. No. 6,399,823 discloses a method for producing phosgene which in one embodiment comprises contacting in at least one reactor a mixture comprising carbon monoxide and chlorine sequentially with a first catalyst followed by contacting the resulting gaseous reaction mixture comprising phosgene with at least one second catalyst of higher relative activity than a first catalyst. In another embodiment a method is disclosed for producing phosgene which comprises contacting in at least one reactor a mixture comprising carbon monoxide and chlorine with at least one catalyst bed comprising a first catalyst wherein at least a portion of said first catalyst is diluted with a second catalyst of higher relative activity than a first catalyst.

WO 2019/023157 is directed at a method of producing synthesis gas within a tubular reformer, comprising introducing a process gas, where the process gas comprises steam and at least one hydrocarbon at an inlet of one or more tubes disposed in the reformer, contacting the process gas with a catalyst in the interior of the one or more tubes, wherein at least a portion of the catalyst has a structural element that circumferentially biases a process gas flow toward at least one tube wall side of greater incident heat flux thereby reducing the maximum tube wall temperature, and removing a reformed process gas at an outlet of the one or more tubes wherein the reformed process gas is a synthesis gas containing predominantly hydrogen, carbon monoxide, carbon dioxide, and water.

US 2002/0072643 discloses a process for the catalytic dehydrogenation of a C2 or C3 alkyl aromatic in which a feedstock containing the alkyl aromatic and steam is supplied into the inlet of a tubular reactor containing a dehydrogenation catalyst. Within the reactor, the feedstock flows through at least a portion of the reactor along a spiral flow path extending longitudinally of the reactor. The resulting vinyl aromatic product is then recovered from a downstream or outlet section of the reactor.

The methods and reactors disclosed in the prior art require either significant modification of existing or entirely new reactor designs. Modifications to the catalyst composition either by the use of different catalyst types and/or by the use of inert diluting materials add complexity to the overall process and may not provide the desired productivity per unit of catalyst.

Accordingly it is an object of the invention is to provide for a reactor tube assembly that allows the manufacture of high purity phosgene, i.e. phosgene with minimised levels of by-products and which may be obtained by relatively simple modification of existing equipment.

More in general terms it is an object of the invention to provide a reactor tube assembly that provides for efficient removal or provision of thermal energy from the zone wherein reaction occurs, which is relatively easy to maintain and relatively easy to provide. In that respect it is noted that the present invention, albeit described herein on the basis of an exothermic reaction, is also suitable for endothermic reactions.

These objects are met, at least in part, with the reactor tube assembly of the invention.

More in particular the present invention relates to Reactor tube assembly comprising
a reactor tube having a tube length and an inner surface, at least two tubular inserts each having an insert length and comprising i) a shell having an exterior portion at least partially contacting the inner surface of the reactor tube, ii) at least one fin projecting from the shell in a radial direction towards a center of said insert, wherein the inserts are positioned in the tube in a stacked manner such that the fins of the at least two inserts are offset in a longitudinal direction a particulate catalyst in contact with at least the shell and the fins of the inserts.

The present inventors have found that existing reactor tubes can be partially filled with inserts having at least two fins projecting a radial direction towards a center of the insert. The fins allow for an increased heat exchanging surface area between the catalyst and the insert and accordingly allows reaction heat to be removed from, or provided to, the catalyst bed more efficiently. In addition to that, by providing the inserts such that the fins of the inserts are in an offset position the present inventors found that the overall heat transfer between the reaction zone, i.e. the catalyst bed where reaction takes place, and the reactor tube is improved as compared to constructions wherein the fins are aligned, i.e. not in an offset position. A stepwise change in position of the fins moreover contributes to a disturbance of the overall flow pattern of the gas inside the reactor tube, which in turn is also advantageous to the heat transfer.

The reactor tube assembly is preferably a reactor tube assembly for carrying out one or more exothermic chemical reactions.

The invention will be further elaborated with reference to the drawings wherein.

Figure 1:
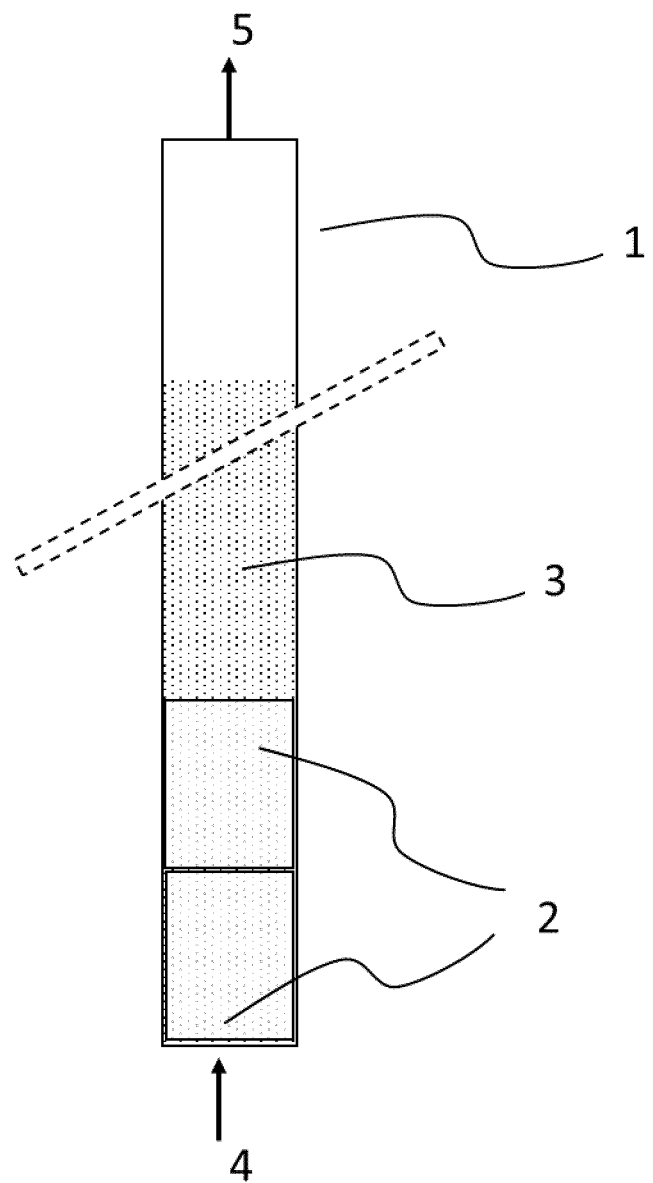
FIG. 1 is a schematic representation of a reactor tube assembly.

FIG. 1 shows a reactor tube assembly comprising a reactor tube 1, two tubular inserts 2 and particulate catalyst 3. Reactants are fed to the tube via reactant side 4 and the reaction product(s) exit the tube at product side 7. As shown in FIG. 1, the insert 2 has an outer diameter slightly smaller, yet substantially similar to the inner diameter of reactor tube 1. The stack of inserts starts extends from the reactant side 4 of reactor tube 1. Catalyst 3 is contained at least in the inserts 2.

Reactor tube 1 of the assembly disclosed herein can have any desirable tube length as required for the type of chemical reaction and the desired output. Preferably the tube length is from 100 to 400 cm, more preferably from 150 to 300 cm. The inner diameter of reactor tube 1 is preferably from 20 to 80 mm, more preferably from 30 to 60 mm. Reactor tube 1 is inert to the chemical reactants and reaction products and is preferably made from a corrosion resistant material such as ceramic, stainless steel, titanium, nickel, or metal alloys such as nickel alloys comprising iron and chromium (e.g. Inconel), or nickel alloys comprising molybdenum and chromium (e.g. Hastelloy).

Figure 2:
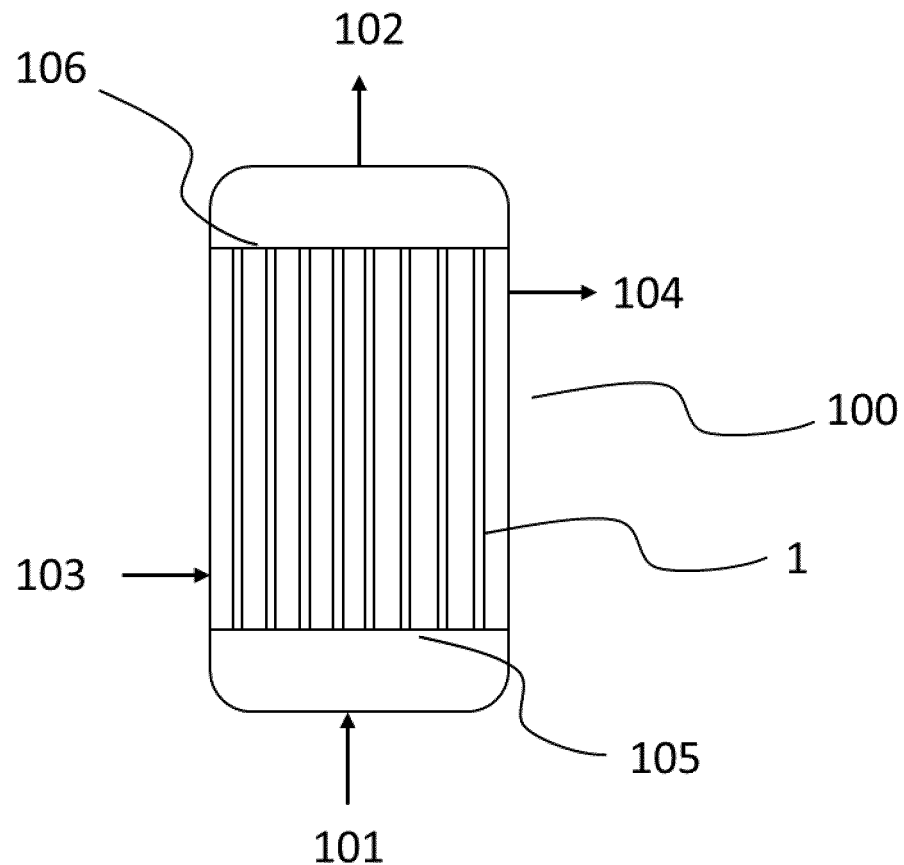
FIG. 2 is a schematic representation of a tube reactor having multiple tubes.

FIG. 2 shows the general layout of a tube reactor 100 comprising a number of reactor tubes 1, distribution plate 105, merger plate 106, cooling medium input 103 and cooling medium output 104. Reactants are fed via feed section 101 and consequently distributed over the multiple reactor tubes 1. At the top of the reactor the product streams coming from reactor tubes 1 are combined using merger plat 106. Plates 105 and 106 seal the reactor tubes, the product stream and the reactant streams from the cooling medium. The cooling medium is in contact with at least part of the external surface of the reactor tubes 1 thereby allowing the transfer of reaction heat generated inside the reactor tubes 1. The cooling medium is not limited and an example is water. It is noted that the present invention is not limited to a cooling medium however and in case of an endothermic reaction the inputs 103 and 104 can be used for a heating medium, such as for example hot oil. For endothermic reactions taking place in typical crackers, such as for example naphtha crackers, the heating medium may be heat from combustion or infrared radiation. Anyhow, the present invention is not limited per se on the type of chemical process that is to be applied in the reactor tube assembly provided such a process requires a chemical reaction in the gas-phase which is catalysed by means of a solid catalyst.

In a typical tube reactor 100 a large number of reactor tubes 1 are positioned such that they operate in parallel. Typically the number of tubes ranges from 5-1000 such as from 100-600, more preferably from 250-500.

Figure 3:
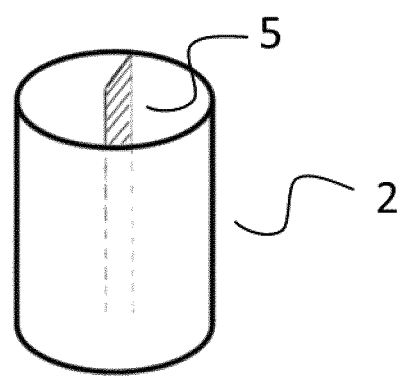
FIG. 3 is a schematic representation of an embodiment of an insert.

FIG. 3 shows a tubular insert 2 containing a fin 5. Fin 5 extends or projects from the shell of insert 5 in a radial direction towards a center of said insert. The fin may project over the whole length of insert 2 or only partially. Also, in FIG. 3 the insert is shown to be projecting from the shell from the same radial direction over the length of the insert, yet the present invention is not limited to that and other configurations can also be envisaged, such as for example a spiral-like configuration, S or Z shaped configuration and the like. Furthermore, as will be explained in a bit more detail below the fin is not limited in shape as long as it provides sufficient surface area for the exchange of reaction heat. For the purpose of disclosure of the invention the reactor tube 1 and inserts 2 are assumed to be circular in shape. The present invention is however not limited thereto and any other tubular shape for the reactor tube can also benefit from the advantageous effect of the present invention provided the inserts are adapted to such other size. For example, in case the reactor tube 1 would be of oval shape, then the inserts would likewise preferably be of oval shape.

Figure 4:
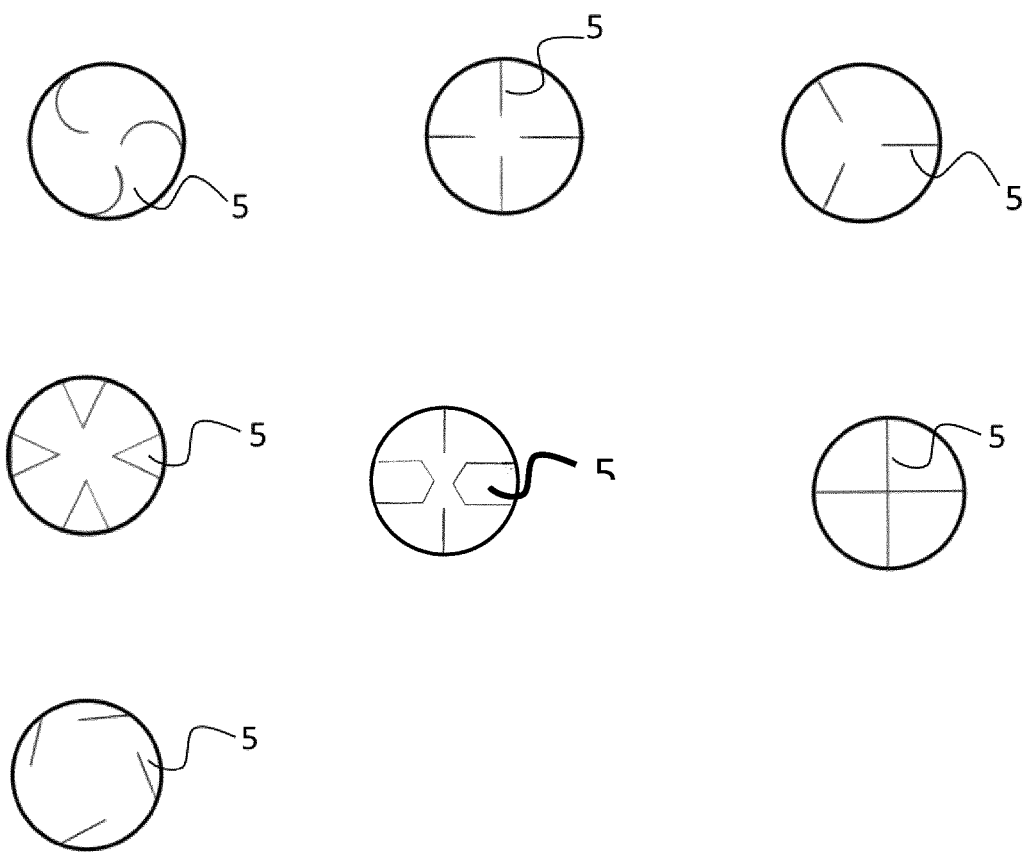
FIG. 4 is a schematic representation of several embodiments of an insert.

FIG. 4 shows several top views of embodiments of insert 2. As shown, the fins 5 can have several shapes and geometries. The embodiments of FIG. 4 all show multiple fins 5, yet in accordance with the present invention already one fin can be sufficient and will provide the advantages as disclosed herein. Preferably the inserts have 2-5, preferably 3-5 fins.

The at least two tubular shaped inserts 2 as used in the reactor tube assembly disclosed herein may have the same or different dimensions and the same or different types and/or amount of fins. Preferably identically shaped inserts are used. In an embodiment however two types of inserts 2 are used which are configured such that in a stacked position the fins by definition cannot align in a longitudinal direction.

The length of insert 2, the insert length, is preferably from 1-20%, more preferably from 2-15%, or from 3-10% of the length of the reactor tube. For the avoidance of doubt, inserts 2 of different length yet with otherwise identical or different configuration may be used. In the assembly the sum of the insert lengths is from 2-80, preferably from 10-60% of the tube length. More preferably the length of the stack of inserts 2, i.e. the sum of the insert lengths, is from 5-35% of the tube length. In that respect the present inventors found that the most heat is generated close to the reactant side 4 of the reactor tube 1. Accordingly it is preferred that the stack of inserts 2 extends from the said reactant side 4, yet there is no need to completely fill the reactor tube 1 with inserts. In addition to that the level of particulate catalyst preferably exceeds the stack of inserts 2 so that any reactants that have bypassed the inserts 2 are still allowed to react further upstream in reactor tube 1. Accordingly it is preferred that the amount of catalyst exceeds an internal volume of the total of, i.e. the stack of, the inserts. Preferably the amount of catalyst exceeds the stack of inserts by at least 10% in a length position, provided that the amount of catalyst 3 in the reactor tube is preferably at most 95% of the length of reactor tube 1. Thus, if the total length of the inserts 2 is 80 cm (from the reactant side) then the level of catalyst is at least 88 cm (from the reactant side).

The outer diameter of insert 2 is such that on the one hand it can be inserted into reactor tube 1 while at the same time there is still sufficient surface area that contacts the inner surface of reactor tube 1 for exchanging heat. This means that the outer diameter of the insert 2 is substantially the same as an inner diameter of reactor tube 1. Preferably the outer diameter of the insert is from 90.0-99.9%, more preferably at least 95.0% or 98.0% of the inner diameter of the reactor tube.

Figure 5:
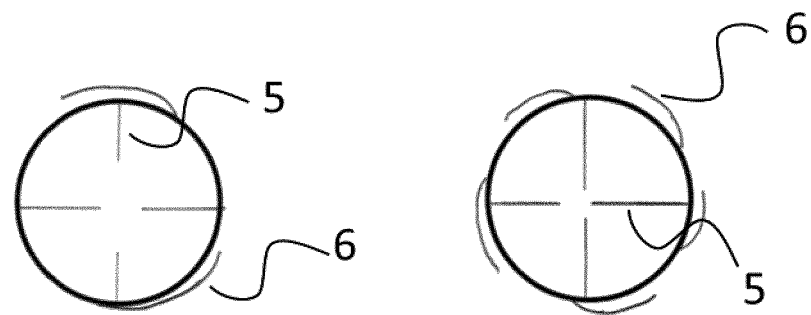
FIG. 5 is a schematic representation of several embodiments of an insert.

In a preferred embodiment, exemplified by FIG. 5, insert 1 contains one or more positioning means 6, or external fins 6, projecting from the shell of insert 2 towards and in contact with the reactor tube 1. Positioning means 6 are configured such that contact with the inner surface of reactor tube 1 is established and the positioning means, also acting as external fins, allow for heat to be exchanged between insert 2 and reactor tube 1. In the assembly disclosed herein the space that is generated between the insert 2 and reactor tube 1 is substantially free of particulate catalyst and thereby allows for a certain amount of bypass of reactants. Thus, a portion of the reactants may flow through the annular space between inserts 2 and reactor tube 1. Under these conditions no reaction takes place resulting in less reaction heat being generated at that position in the reaction tube 1. Accordingly it is preferred that the insert(s) closest to reactant side 4 contain the positioning means 6, while inserts 2 further upstream do not contain the positioning means.

Figure 6:
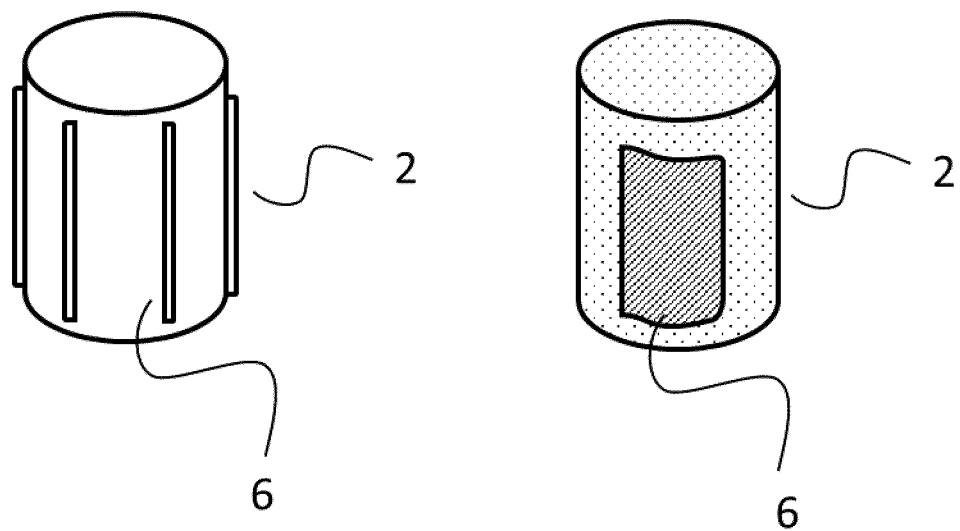
FIG. 6 is a schematic representation of alternative embodiments of an insert.
Figure 7:
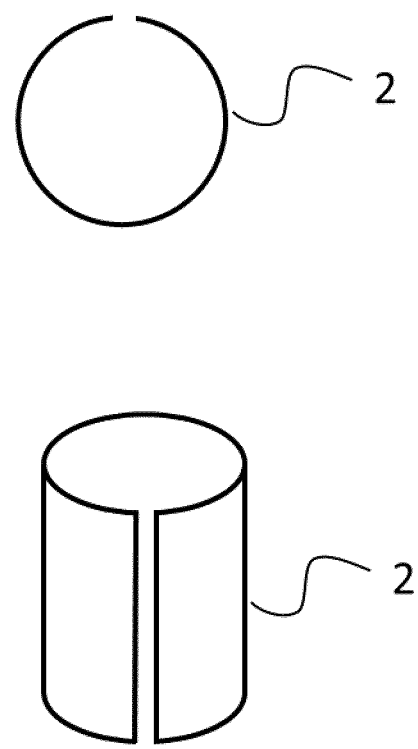
FIG. 7 is a schematic representation of an alternative embodiment of an insert.

FIG. 6 shows two possible configurations for the positioning means. As with the internal fins 5, the positioning means 6, or external fins 6, are not required to run over the whole length of insert 2 and may extend from the shell of insert 2 from a fixed or varying radial position. It is preferred that the positioning means is of the shape as shown in FIG. 5. That is, it is preferred that the positioning means 6 is configured such that it functions as a spring. In an alternative embodiment insert 2 is of a discontinuous tubular shape as schematically shown in FIG. 7. The advantage of such shape is that the insert can be slightly compressed in radial direction, thereby lowering its outer radius, and allowing it to be inserted into reactor tube 1, where it can decompress after insertion allowing it to contact the inner surface of reactor tube 1 more efficiently. Although not shown in FIG. 7, external fins 6 may be applied for the purpose of creating the bypass effect. In an alternative embodiment a tube shaped sheet (preferably metal) can be compressed such that the outer ends partially overlap while in compressed position. Once inserted and decompressed the outer ends may be less compressed or even have the shape as shown in FIG. 7

Inserts 2 are preferably made from a material that is inert to the reactants and/or reaction products. Typical materials are the same as those employed for reactor tubes 1, with metal being preferred, in particular stainless steel. It is further preferred that inserts 2 are monolithic in structure meaning that the inserts only consist of a single material. It is further preferred that inserts 2 are manufactured from a flat sheet of metal wherein the fins 5 and/or positioning means 6 are obtained by partially cutting out appropriate parts of the sheet followed by bending the sheet into a tubular shape and by pressing the partially cut out portions either inward or outward so as to obtain the fins and or positioning means.

Catalyst 3 may be any particulate catalyst known for the intended product to be formed. Specifically for the manufacture of phosgene the catalyst is activated carbon. For the avoidance of doubt it is to be understood that the reactor tubes 1 will not operate such that the bed is operated in a fluid bed condition. Thus, the particulate catalyst 3, in operation, is a fixed bed. The present invention avoids or at least reduces to a minimum the peak temperature in the reactor tubes 1 by means of the inserts. However, if there would be a need to further reduce the peak temperature the catalyst 3 may be mixed with from 1-50, preferably from 5-20 vol. % of inert materials, or alternatively the catalyst 3 may be a mixture of high activity catalyst and low activity catalyst. Typical inert materials may be steel or glass, with steel being preferred as it is more thermally conductive. The particulate catalyst is configured such that it can be added and removed from the reactor tube without removing the inserts. Accordingly a diameter of the catalyst particles is at least 3, preferably at least 5, more preferably at least 10, at least 20 or at least 30 times smaller than the internal diameter of the inserts. Thus, the catalyst preferably has a diameter of from 0.05-20 mm, more preferably from 0.1-10 or from 0.5-5 mm. For non-spherical catalysts the term diameter refers to the maximum dimension when measured from one side of a particle to another. In an embodiment where a catalyst mixture of catalyst and inert materials is used, the inert materials may have the same or a different dimension as the catalyst particles, provided that the inert materials have a diameter which is at least 3, preferably at least 5, more preferably at least 10, at least 20 or at least 30 times smaller than the internal diameter of the inserts. The inert material preferably has a diameter of from 0.05-20 mm, more preferably from 0.1-10 or from 0.5-5 mm. For non-spherical inert materials the term diameter refers to the maximum dimension when measured from one side of an inert material particle to another. With respect to the foregoing the term "diameter" is to be regarded as the average diameter. Particle size and/or particle size distribution can be measured in known manners, such as sieving and microscopic techniques.

The present invention relates to the use of the inserts as disclosed herein in reactor tubes for carrying out an exothermic reaction.

The present invention further relates to the use of the inserts as disclosed herein in reactor tubes used for the manufacture of phosgene, where carbon monoxide and chloride are reacted in the presence of an activated carbon catalyst.

The present invention further relates to a method for the manufacture of phosgene, where carbon monoxide and chloride are reacted in the presence of an activated carbon catalyst in a reactor as disclosed herein, i.e. a reactor comprising the reactor tube assembly as disclosed herein.

The present invention more generally relates to a method for performing an exothermic gas-phase reaction in a tubular reactor comprising one or more of the tube assembly as disclosed herein.

The present invention also generally relates to a method for performing an endothermic gas-phase reaction in a tubular reactor comprising one or more of the tube assembly as disclosed herein. In this aspect of the invention the heat of reaction is preferably provided such that a temperature difference over the circumference of the tube at a particular longitudinal position is less than 10° C., preferably less than 5° C.

The invention claimed is:

1. A reactor tube assembly comprising
a reactor tube having a tube length and an inner surface,
at least two tubular inserts each having an insert length and comprising i) a shell having an exterior portion at least partially contacting the inner surface of the reactor tube,
  ii) at least one fin projecting from the shell in a radial direction towards a center of said insert,
wherein the inserts are positioned in the tube in a stacked manner such that the fins of the at least two inserts are offset in a longitudinal direction
a particulate catalyst in contact with at least the shell and the fins of the inserts.

2. The reactor assembly of claim 1 wherein the insert length of the inserts is the same or different and is from 1-20% of the tube length.

3. The reactor assembly of claim 1 wherein the sum of the insert lengths is from 2-80% of the tube length.

4. The reactor assembly of claim 1 wherein the inserts have from 2-5 fins.

5. The reactor assembly of claim 1 wherein the inserts further comprise at least 2 positioning means projecting from the shell towards and in contact with the inner surface of the reactor tube.

6. The reactor assembly of claim 1 wherein the amount of particulate catalyst exceeds an internal volume of the inserts.

7. The reactor assembly of claim 1 wherein the stacked inserts extend from an outer end of the reactor tube.

8. The reactor assembly of claim 1 wherein substantially no catalyst is present in the space between the shell of the insert and the inner surface of the reactor tube.

9. The reactor assembly of claim 1 wherein the inserts are made from metal.

10. The reactor assembly of claim 1 wherein the particulate catalyst is configured such that it can be added and removed from the reactor tube without removing the inserts.

11. A reactor comprising one or more of the tube assembly of claim 1.

12. A method comprising providing the reactor tube assembly of claim 1 and carrying out a chemical reaction using the reactor tube assembly.

13. The method of claim 12 comprising reacting carbon monoxide and chloride in a reactor comprising the reactor tube assembly.

14. The method of claim 13 wherein the carbon monoxide and chlorine are fed to the tube assembly at the side from which the inserts extend.

15. The reactor of claim 11 wherein the reactor is a phosgene reactor.

16. The reactor assembly of claim 7 wherein the stacked inserts extend from the outer end of the reactor tube where the reactants are fed to the reactor tube.

17. The method fo claim 12 wherein the chemical reaction comprises reacting gseous reactants.

* * * * *